United States Patent [19]

Benway et al.

[11] Patent Number: 5,136,134
[45] Date of Patent: Aug. 4, 1992

[54] ORBITAL WELDING APPARATUS

[75] Inventors: Ernest A. Benway, Mentor; Theodore J. Gausman, Concord; Charles N. Richards, Twinsburg, all of Ohio

[73] Assignee: Cajon Company, Macedonia, Ohio

[21] Appl. No.: 606,421

[22] Filed: Oct. 31, 1990

[51] Int. Cl.$^5$ ............................................. B23K 9/12
[52] U.S. Cl. .................. 219/60 A; 219/125.11
[58] Field of Search ............... 219/60 A, 60 R, 61, 219/125.11

[56] References Cited

U.S. PATENT DOCUMENTS

| 3,225,171 | 12/1965 | Tinnes | 219/60 A |
| 3,636,294 | 1/1972 | Peyrot | 219/60 A |
| 4,199,673 | 4/1980 | Theibaut et al. | 219/60 A |

Primary Examiner—Clifford C. Shaw
Attorney, Agent, or Firm—Fay, Sharpe, Beall, Fagan, Minnich & McKee

[57] ABSTRACT

An orbital welding apparatus comprising a modular weld head unit including a circular rotor carrying a welding electrode for rotation about an axis for welding abutting ends of tubular members positioned in alignment on the axis. A drive assembly for driving the rotor includes a motor unit carried in a separate modular housing for ready manual connection and disconnection from the weld head unit. In the preferred form a transmission module is connected with the motor unit and connects to the weld head unit by a flexible drive shaft assembly to allow the motor unit to have substantially any desired orientation relative to the weld head unit. There is also disclosed a separate clamping assembly for holding the tubular members relative to the weld head unit.

26 Claims, 8 Drawing Sheets

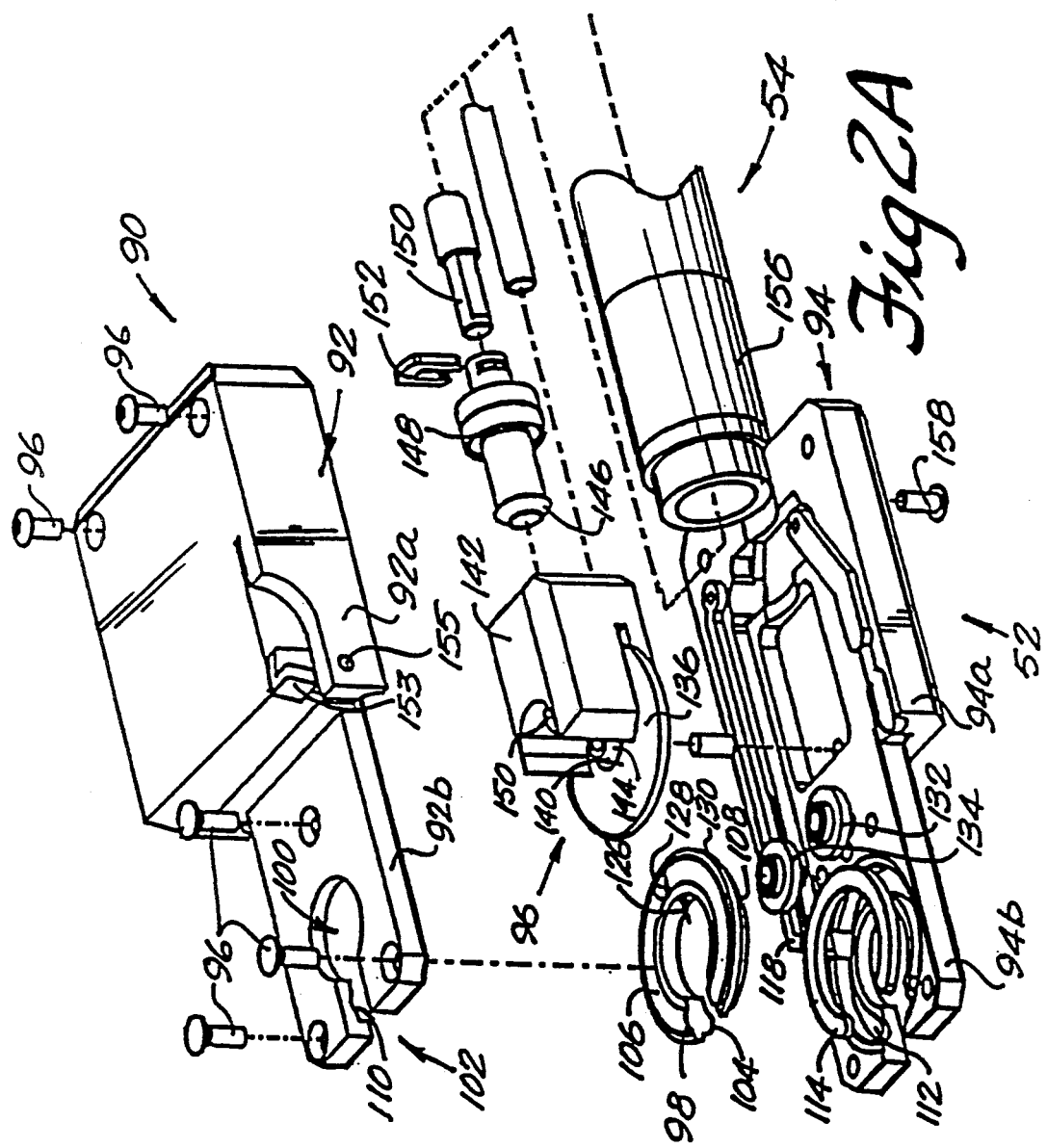

ORBITAL WELDING APPARATUS

BACKGROUND OF THE INVENTION

The subject invention is directed toward the art of welding and, more particularly, to an orbital welding apparatus for circular products such as tubes or rods.

The invention is especially suited for incorporation in apparatus for welding small diameter tubing in closely confined spaces and will be described with reference thereto. It should be appreciated, however, that the invention is capable of broader application and could be used in many different welding devices of widely varying sizes for many purposes.

Orbital arc welding equipment is often used to weld tubing and piping for use in fluid handling and processing systems. Currently, there is significant interest in welding small diameter tubing, fittings, and control equipment such as valves, filters, and the like to form small, compact control and processing systems. Frequently, the various components must be welded in confined and nearly inaccessible areas. In addition, system designers are desirous of reducing, to the greatest extent possible, the size of the processing and control systems by reducing the distance between components. Much effort has been expended in miniaturizing tube fittings and system components; however, the space required by the welding apparatus has been a significant limitation on further system size reduction.

The subject invention provides a unique combination of features which allows welds to be made in extremely confined spaces and under conditions which have heretofore prevented use of orbital welding equipment. The invention makes it possible to obtain the maximum system size reduction benefits through the use of miniaturized fittings and components.

BRIEF DESCRIPTION OF THE INVENTION

In accordance with one aspect of the invention there is provided an orbital welding apparatus which comprises a first housing defining a weld head assembly and including a circular rotor disposed therein for rotation about a first axis. A welding electrode is carried by the rotor and extends radially inward toward the first axis. Suitable drive gears are carried in the first housing for rotating the rotor about the first axis and a first drive shaft is drivingly connected to the gears and extends from the first housing in a direction perpendicular to the first axis. A second housing separate from the first housing forms a power transmission and has a second drive shaft extending therefrom. A flexible drive shaft means connects the first drive shaft and the second drive shaft to conduct rotary drive forces from the first drive shaft to the second drive shaft while permitting the relative orientations of the first and second housings to be freely adjustable. A third separate and independent housing carries an electric drive motor and forms a power drive motor module with a rotary output shaft. Releasable connecting means are provided for quickly connecting the third housing with the second housing for permitting connection and disconnection of the rotary output shaft of the motor module with the second drive shaft so that the motor module can be manually connected and disconnected from the transmission and weld head assemblies quickly and easily.

The described arrangement permits the same motor module or power unit to be quickly changed between weld heads intended for welding tubing of different sizes. Moreover, because the weld head is connected to the transmission housing through a flexible drive, the motor module can have various desired orientations relative to the weld head module and the weld head module can be placed in extremely confined quarters without requiring that the motor module be associated therewith in a particular orientation.

In accordance with a more limited aspect, there is a gas line extending through the flexible drive shaft means to the housing to allow gas to be supplied to the weld head. Additionally, a gas supply connection extends through the motor module housing. A valved connecting arrangement joins the gas line in the motor module with the gas line in the flexible drive shaft whenever a motor module is connected thereto. Preferably, the valved connecting arrangement opens automatically when the motor module is connected to the flexible drive shaft.

In accordance with a further aspect of the invention, there are electrical power cables also extending through the flexible drive shaft. Suitable electrical connectors are provided so that power connection takes place automatically when the motor module is connected to the flexible drive shaft. Thus, when changing orbital weld head modules, there is an automatic connection of both the gas and the electric power necessary for the operation of the weld head assembly.

The subject invention also provides an improved tube clamping assembly for use with the weld head to hold the cylindrical tube ends in axially aligned abutting relationship while the welding is performed to join the tube ends. The clamp assembly generally comprises a rectangular base with an opening extending therethrough defining a path of movement for slidably receiving the orbital weld head. A first pair of transversely spaced clamp arms extend from the base on opposite sides of the base opening. A second pair of transversely spaced clamp arms extend from the base on opposite sides of the opening in alignment with the first pair of clamp arms. The first and second pairs of arms include cooperating clamp jaws for gripping on opposite sides of the tube ends and maintaining them coaxially aligned with a first axis. The second pair of arms are mounted for pivotal movement about a second axis which extends parallel to the first axis and is in a common plane therewith which is aligned with the path of movement of the weld head into the opening in the base member. Additionally, actuating means are provided for moving the second pair of clamp arms between their open and closed positions. Further, in the closed position, the clamp arms mate along a line which includes the common plane.

The described arrangement of the arms opening in the manner described allows the clamp assembly to be moved into position around tubes confined in corners and closely adjacent walls since the movement of the clamping of the arms takes up a minimum amount of space and does not require any significant amount of space in the area beyond the outermost extent of the arms. That is, the clamp arms engage in the manner of a pair of pliers being moved into position on the tubing. Access to the side of the tubing opposite the weld head is not required. Further, the design requires a minimum amount of space on the lateral sides of the clamp assembly.

A further aspect of the invention contemplates that the arms of the clamp assembly are moved between their open and closed position through the use of a cam actuating assembly wherein the assembly is located in an enclosed position between the arms and the base plate in a concealed and confined manner and wherein the operating portions of the actuating means are located at a position spaced remotely from the outer end of the clamp assembly. Thus, when used in confined spaces, the actuating means are readily operable even though the clamp elements are enclosed and confined by surrounding environmental structure.

In accordance with another aspect of the invention, the operating portions of the clamp assembly actuating means are arranged such that when the orbital weld head assembly is in operating position in the clamp assembly, interengaging portions prevent opening or operating of the clamp arms. Thus, the clamp arms cannot inadvertently open during a welding operation.

As is apparent from the foregoing, a primary object of the invention is the provision of an orbital welding apparatus which is capable of being used in extremely confined spaces and which can weld extremely small fittings and produce miniaturized piping and control systems.

A further object of the invention is the provision of an orbital welding apparatus of the general type described wherein the various modules used to make up the system can be oriented at selectively different arrangements relative to one another while the unit is being fitted to the components being welded and while the apparatus in use and actually making a weld.

A further object is the provision of a system of the type described wherein the same power and control module can be used with a variety of different weld head modules so that the system is capable welding tubing of many different sizes while being operated off a single power module.

A further object of the invention is the provision of a system of the general type described wherein a flexible drive connection conveys rotary power, electrical power, and weld environment gas simultaneously and wherein connection and disconnection of the power unit from the weld head assembly automatically connects and disconnects not only the rotary power but also the electrical power and weld environment gas.

BRIEF DESCRIPTION OF THE DRAWINGS

The invention may take physical form in certain parts and arrangement of parts, preferred and alternate embodiments of which will be described in detail in the specification and illustrated in the accompanying drawings which form a part hereof, and wherein.

DETAILED DESCRIPTION OF THE PREFERRED EMBODIMENT

Figure 1:
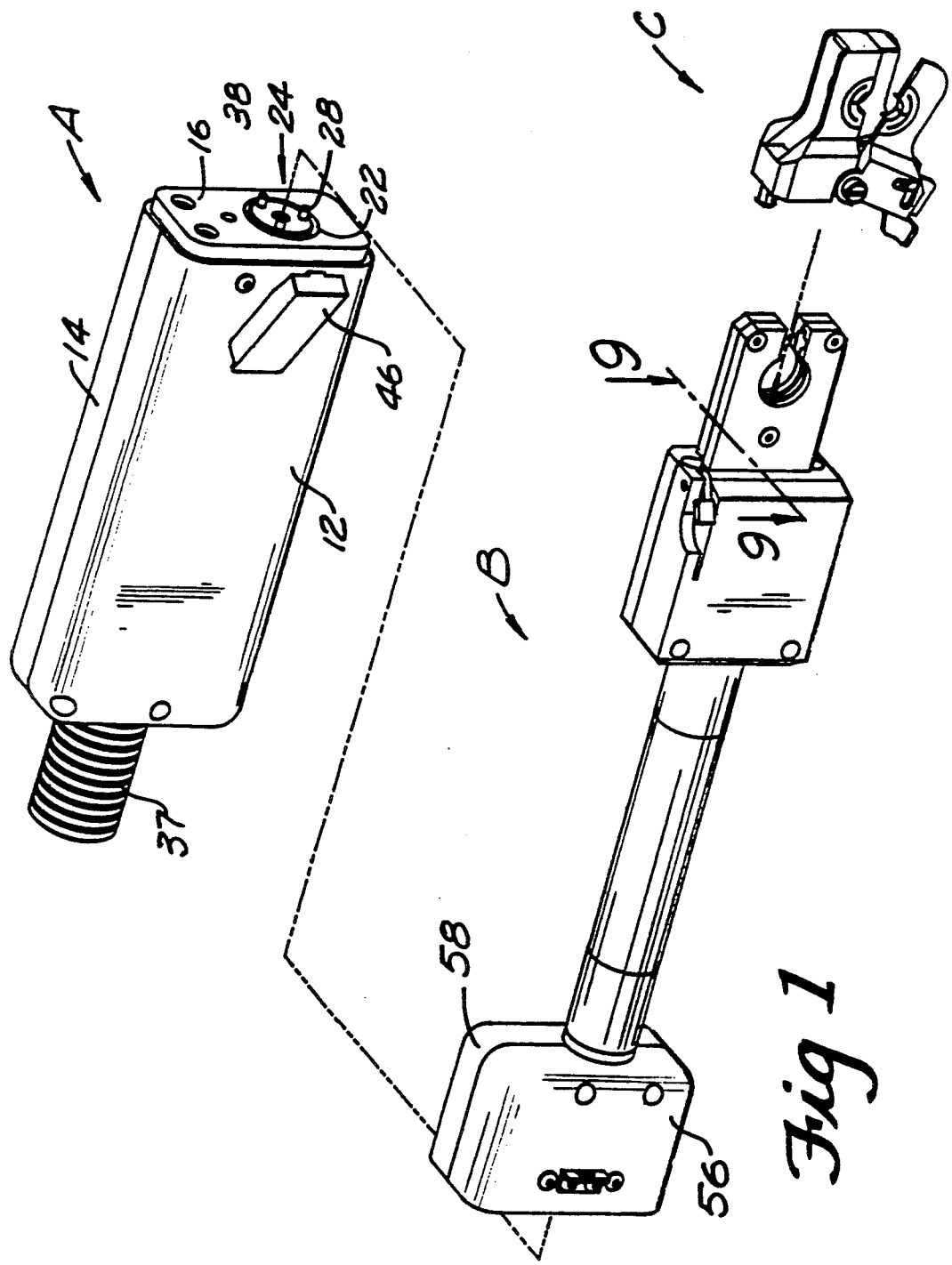
FIG. 1 is a pictorial view showing the overall construction and arrangement of the orbital welding assembly of the subject invention.

Referring more particularly to the drawings wherein the showings are for the purposes of illustrating a preferred embodiment of the invention only, and not for the purpose of limiting same, FIG. 1 shows the overall construction and arrangement of an orbital welding assembly formed according to the subject invention and comprising a motor and drive module A which is arranged releasably connected to a transmission and welding head module B which is associated with a tube clamp and holding module C. Merely by way of explanation and general background, the various modules are arranged to be quickly and rapidly assembled and disassembled so that, for example, the motor and drive module A can be used with different transmission and weld head modules B. For example, a single motor and drive module can be used with a variety of different sizes of transmission and weld head modules. Additionally, and for further example, the tube clamp and holding assembly C is quickly and easily releasable from the transmission and welding head assembly B such that it can be separately connected to and positioned relative to the tubing to be joined and a multiple number of such tube clamping and holding units or modules can be used with a single transmission and weld head module to allow welding to take place while additional tube ends are clamped in alignment by additional clamping and holding modules in preparation for welding operation.

Figure 3:
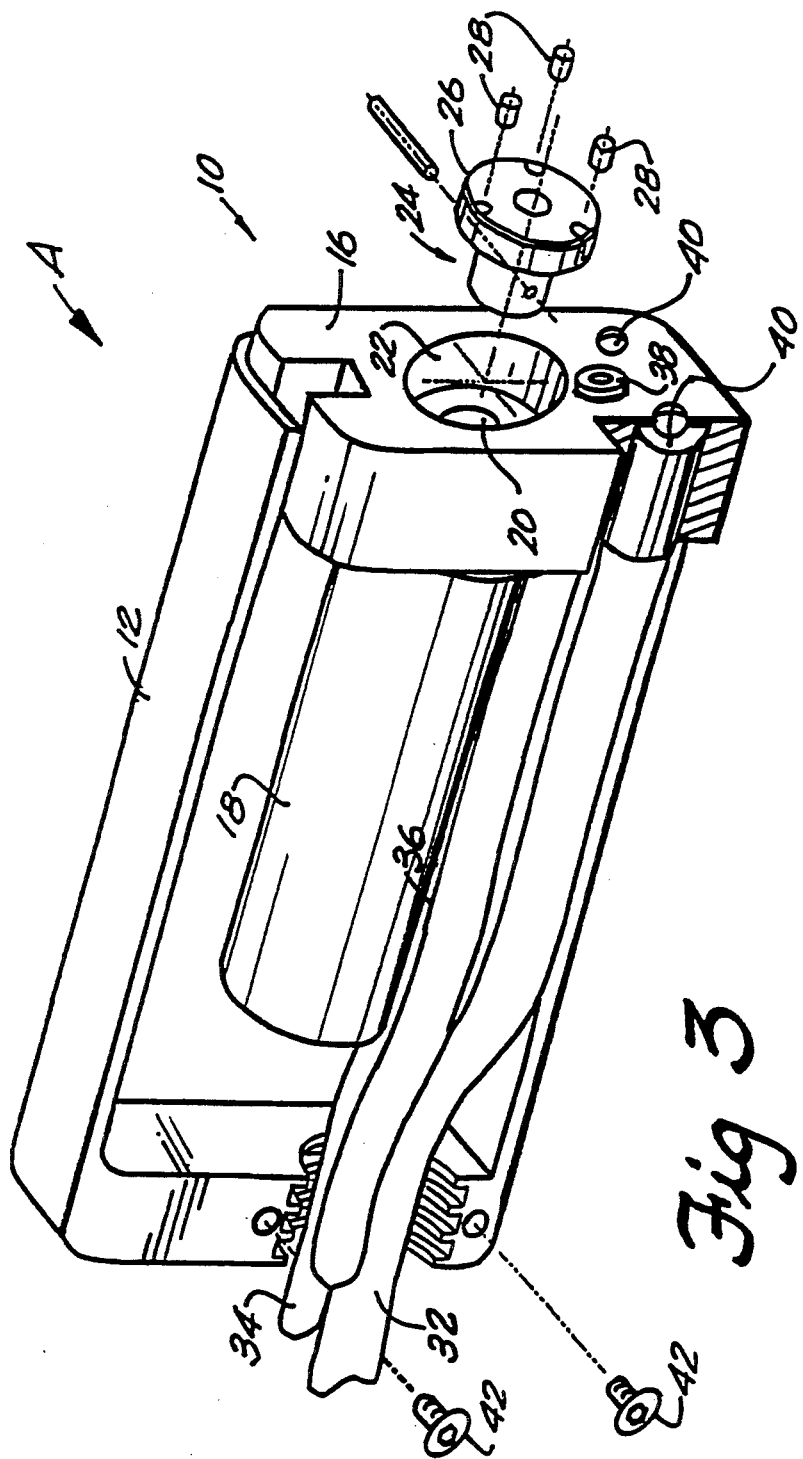
FIG. 3 is an exploded pictorial view of the drive motor module A of the assembly illustrated in FIG. 1.

More specifically, and as best shown in FIG. 3, the motor and drive module comprises a relatively elongated housing assembly 10 formed by a pair of clam shell type housing halves 12 and 14 (shown in FIG. 1) and a traverse end plate 16. The components 12, 14 and 16 are formed from any suitable material such as a nonconductive thermoplastic or other non-conductive material having adequate strength and wear characteristics. An elongated small diameter electric motor 18 is supported within the housing by having its output end suitably connected to the end plate 16. The drive shaft 20 of motor 18 extends freely through a suitable opening in the end plate 16 into a comparatively large diameter counterbored section 22. A drive connection element 24 is pinned or otherwise positively connected to the drive shaft 20 and has an enlarged diameter end portion 26 which carries axially extending pins 28. The pins 28 are retained in portion 26 and provide a rotary drive connection with the transmission and weld head module in a manner subsequently to be described.

At the opposite end of the housing assembly lo there is provided a central inlet opening or passage 30 through which the electrical power lines or cables 32 and 34 enter the motor drive housing. Also entering through the opening 30 is a gas supply line 36 which supplies an inert gas to provide a suitable inert gas atmosphere about the welding operation which takes place in the weld head module. Many different types of gas are used to provide the necessary inert atmosphere and such are well known in the art.

Figure 10:
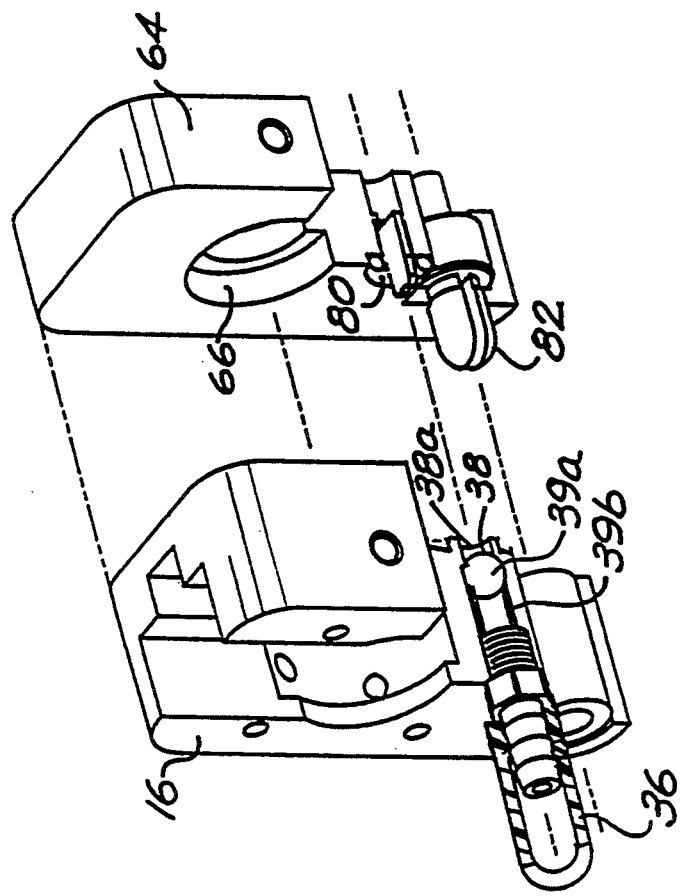

The gas line 36 is connected to the head or end plate 16 and a flow line 38 is provided through the head end for connection with the transmission and weld head module. A check valve 39 is provided in flow line or opening 38 as shown in FIG. 10. In the preferred embodiment, the check valve 39 is a simple ball member 39a which is biased toward a seated, sealed position by a spring 39b. The ball member 39a is moved open against the bias of spring 39b when the motor and drive module A is joined to the transmission and welding head module as will subsequently be described.

As also seen in FIG. 10, the power cables 32 and 34 are provided at their ends with electrical socket connectors 40 that, as will become apparent, allow a simple plug-in connection with the cooperating elements of the transmission and weld head module in a manner which will subsequently be discussed. The arrangement of the socket type connectors 40 is conventional and they are suitably retained in the end plate 16 while being insulated therefrom.

At the entrance end to the housing assembly 10, the cables 32, 34 and the gas line 36 are suitably enclosed by a resilient protective hose member 37 which has its end clamped between the housing half sections 12 and 14 (as shown in FIG. 1). Additionally, it should be noted that the housing sections are releasably clamped together in any convenient manner such as through the use of a plurality of socket head machine screws 42 or the like.

Referring again to FIG. 1, it will be noted that the motor and drive module A is connected with the transmission and welding head module B through the use of a conventional over center type, lever actuated toggle or latch mechanism indicated generally with the reference numeral 46. The use of such latch mechanisms is well known and many different types of quick release connections could equally well be used to allow positive connection of these components while permitting ready disconnection when it is desired to change the particular weld head assembly being used with the motor and drive assembly or module A.

The Transmission and Weld Head Module Assembly B

Figure 2:
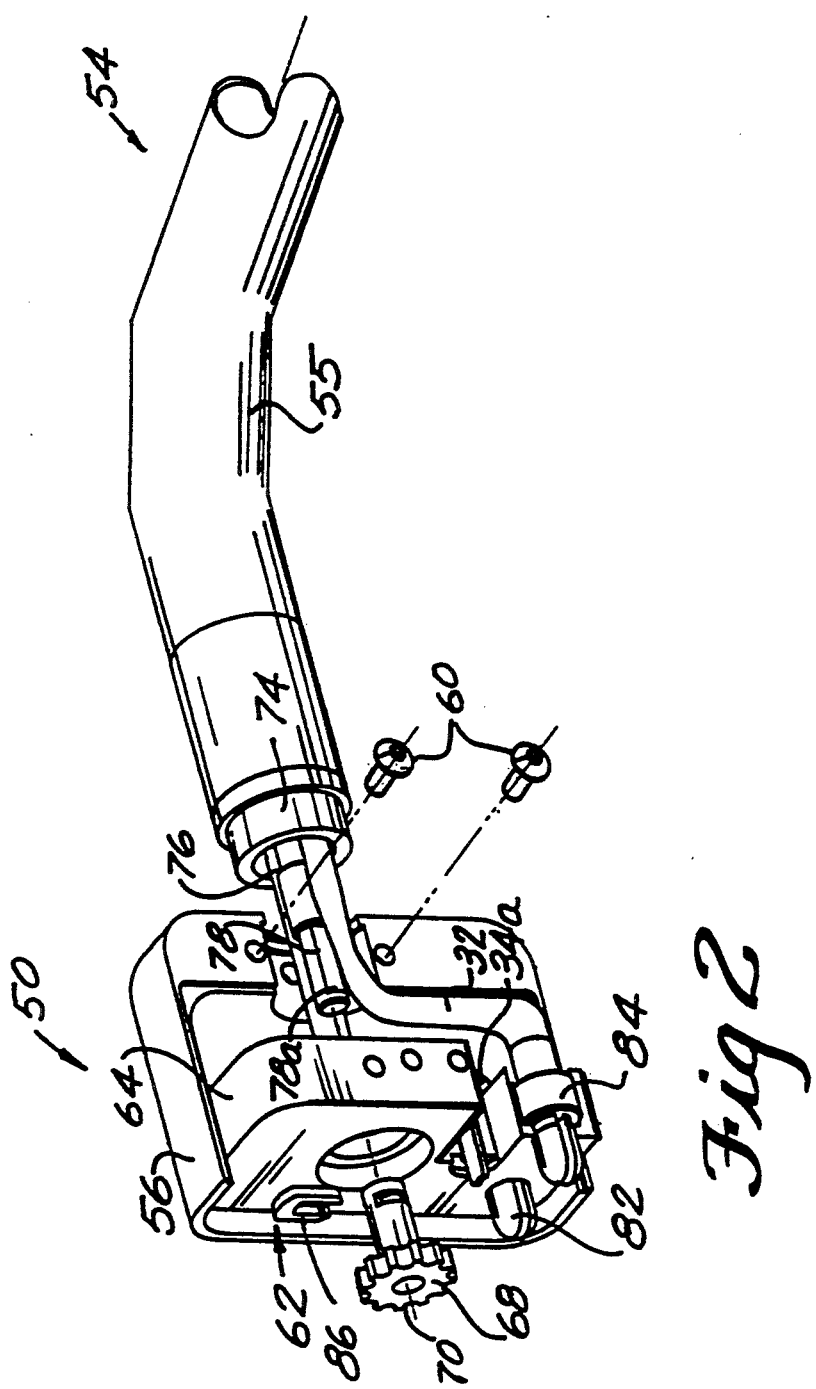
FIG. 2A are exploded pictorial views of the transmission and orbital weld head units, respectively, which together make up module B of the assembly illustrated in FIG. 1.

Referring in particular to FIGS. 2 and 2A, the overall construction and arrangement of the components which make up the transmission and weld head module are shown in some detail in exploded pictorial form. In general, the module B comprises a transmission unit 50 and an orbital weld head unit 52. In the subject embodiment and in the preferred form of the invention, the transmission unit 50 and the weld head unit 52 are drivingly interconnected by a flexible drive shaft assembly 54. However, in certain environments and under certain conditions of operation, the flexible drive shaft assembly 54 could be dispensed with and a direct connection provided between the noted components. In FIGS. 2 and 2A, the flexible drive shaft assembly 54 is shown as of indeterminate length with opposite ends thereof shown connected to each of the components 50, 52.

Referring more particularly to FIG. 2, it will be seen that the transmission unit 50 includes a three-part housing including side elements or housing components 56 and 58 (see FIG. 1), which are basically mirror images of one another. The side elements 56 and 58 cooperate to form a clam shell type housing which is interconnected in a releasable manner to the end plate member or wall 64 through the use of a suitable mechanical fastener such as socket head machine screws 60. The outer configuration of the housing as formed by the components 56, 58 has an overall size and external shape which generally corresponds to the shape of the motor module unit. More particularly, it should be noted that when assembled as shown in FIG. 1, the outer end of the motor module end plate 16 is closely received in the open end 62 of the housing of a transmission unit 50. This provides a close coupling and sealing and encloses the electrical connections as well as the drive elements.

Positioned within housing components 56, 58 and located inwardly from the open outer end 62 is the rigid end plate member 64 which is also releasably connected to the housing components 56, 58 in any convenient manner such as through the use of machine screws or the like (not shown). A counterbored section or opening 66 is formed in the end plate member 64 at the location shown. (See FIG. 10 also). Carried within this counterbored section 66 and freely rotatable in suitable bearings located internally of the opening 66 is a gear-like drive element or member 68. The external periphery of the larger diameter end of the drive element 68 is provided with a multiplicity of uniformly spaced, generally semi-cylindrical recesses 70 which are sized and spaced so as to closely and drivingly engage the axially extending pins 28 on the drive connection element 24 (see FIG. 3) when the units are in the coupled condition shown in FIG. 1.

It should be noted that the opposite end of the housing component 56, as well as housing component 58, include integral wall sections formed to provide an outer end wall. The two housing components 56, 58 have mating semi-cylindrical recesses which together define a cylindrical opening 72 which is sized to closely receive the end 74 of the flexible drive shaft assembly 54. End 74 is a rigid metal collar and is clamped between the housing components 56, 58 and held therein through cooperating grooves as illustrated.

Figure 10A:
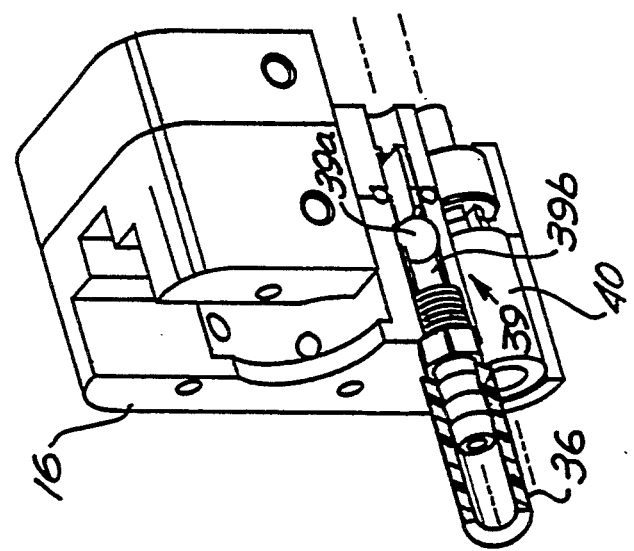

The flexible drive shaft assembly 54 is a conventional flexible drive assembly. The outer housing or sheath 55 of this flexible drive assembly is formed of a braided Teflon hose covered with a stainless steel braided outer layer. Extending axially through the center of the outer housing or sheath 55 is the flexible drive shaft element 76 which terminates in a rigid drive connection or end 78. The space available within the outer housing or sheath 55 is sized so as to be capable of holding the electrical cables 32a and 34a. Additionally, there is sufficient space through the interior of the housing so as to allow free passage of the gas line 36 connecting with opening 38 (as shown in FIG. 3). In this regard, a suitable opening 80 is formed through the end wall 64 at a location corresponding to opening 38 in the end wall 16 of the motor and drive module A. A suitable sealed connection is provided between openings 80, 38 by an O-ring 81 which is located in a recess about opening so and engaged by boss 38a which extends out about opening 38 as shown in FIGS. 10 and 10A. It should also be seen that the ends of cables 32A and 34A are connected to suitable plug type electrical connectors 82 and 84 respectively. These connectors are of conventional design and are suitably mounted in the end wall 64 at locations corresponding to the locations of the socket connectors 40 of the motor module A.

The end 78 of the flexible drive shaft element 76 is connected to the drive member 68 by a cooperating flat and a C-ring or spring clip. The C-ring 86 and the flat 78A provide a rotary drive connection in which the shaft end 78 can axially move by sliding as is required when the flexible drive unit undergoes substantial bending. As can be appreciated, the overall arrangement thus far described allows rapid connection and disconnection of the motor module from the transmission unit 50. Additionally, as can be seen, the electrical and gas connections are made automatically upon a simple plugging together of the two components.

Figure 9:
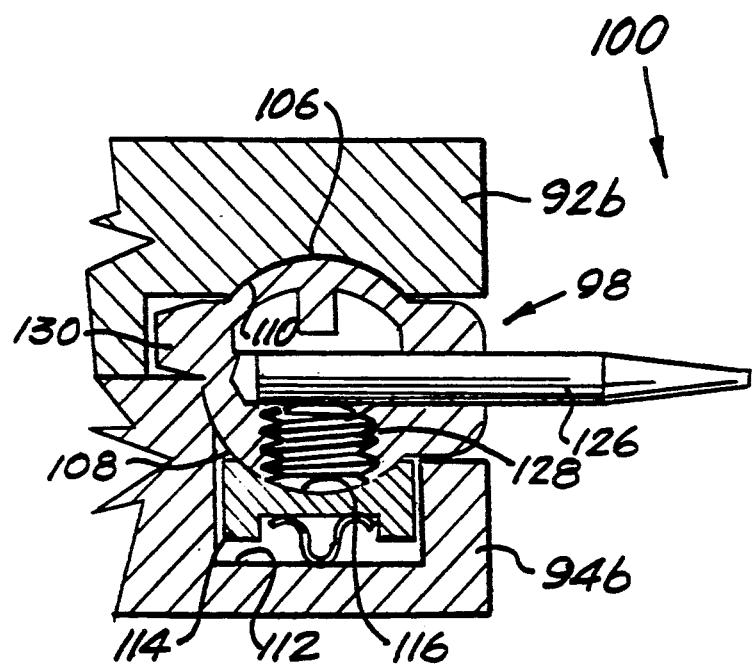
FIG. 9 is a cross-sectional view taken on line 9—9 of FIG. 1 and showing the mounting and side loading arrangement for the electrode holder; and, FIGS. 10 and 10A are pictorial views (partially in cross-section) illustrating the manner in which the motor module is joined to the transmission module.

The orbital weld head is, as previously mentioned, connected to the opposite end of the flexible drive shaft assembly 54. The details of construction of the weld head are best illustrated in FIG. 2A. As shown therein the orbital weld head 52 generally comprises an outer frame and housing 90 which is defined by a pair of opposed body sections or members 92 and 94. These sections are suitably molded or machined from a non-conductive, high strength, high temperature resistant material. The body sections 92, 94 are joined in mating relationship in any suitable manner such as through the use of socket head machine screws 96. It should be seen that the body sections 92, 94 each include a first generally rectangular end portion or body section 92A and 94A respectively. These sections cooperate to define an internal chamber of generally rectangular shape into which a right angle drive assembly 96 is releasably received. The details and arrangement of the drive assembly 96 will subsequently be described. For the present, however, it should be noted that the body members 92 and 94 each further include relatively thinner and smaller generally rectangular sections or members 92B and 94B respectively. These sections are arranged to house the gearing and transmission elements for connecting rotary motion from the right angle drive assembly 96 to the rotor or electrode holder 98. In this regard, FIG. 9 together with FIG. 2A shows the overall arrangement for the electrode holder and the mounting thereof. More particularly, each of the sections 92B and 94B cooperate to define a tube receiving through opening 100 and a laterally open entrance area 102. This arrangement allows the tube ends to be positioned in abutment and the weld head moved laterally thereover to bring the abutted tube ends into alignment with the electrode holder at the location necessary for performing the weld. The tube ends are suitably held in proper alignment and position by the tube holding and clamping assembly C in a manner subsequently to be described. As shown, the rotor or electrode holder 98 is generally circular in shape but has an Open side or opening 104 which is of a width sufficient to allow the holder to pass over the exterior diameter of the particular size of tubing which the weld head 52 is intended to weld. Both sides of the rotor or electrode holder 98 have a continuous convex configuration as illustrated to define a circular guide surfaces 106, 108. In the embodiment under consideration, the electrode holder 98 is formed from a relatively hard copper; however, any suitable wear resistant and electrically conductive material could be used. The body section 92B is provided with an inwardly extending machined groove 110 which is concentric with the opening 100 and provides a guide track which receives the guide surface 106. In the body section 94B, there is a circular recess 112 which is coaxial with the opening 100 and is machined to receive a circular brush member 114. The brush member 114 has a circular shape with its upper surface shaped to form a complementary guide track for the guide surface 108 on the rotor or electrode holder 98. The surface is identified with the numeral 116 and extends circumferentially about the opening 100. The brush member 114 is connected through an electrical bus bar 118 With a connector 120 which is joined to the end of the power cable 34A (shown in FIG. 2). The power cable 32A (shown in FIG. 2) is electrically connected With a plug element 122 which extends outwardly adjacent the sections 92B and 94B as illustrated in FIG. 2A. This completes an electrical circuit from cable 32A to the tube holding and clamping module c in a manner subsequently to be described.

The electrode holder 98 carries a suitable tungsten electrode 126 which is adjustably clamped in the holder by a set screw 128. As can be appreciated, rotation of the electrode holder about the axis of opening 100 allows a weld to be performed on abutting tube ends suitably positioned within the opening 100 in a manner well known in the art.

The rotation of the electrode holder 98 is accomplished through a gear train connected with the right angle drive assembly 96. In this regard, it should be noted that the outer periphery of the electrode holder 98 is provided with gear teeth 130 which mate with corresponding teeth carried on the individual mating gears 132 and 134. Gears 132 and 134 are positioned as shown and carried on suitable axles and bearings mounted in the section 94B as illustrated. Drive gear 136 is in driving engagement with the gears 132 and 134 to provide two separate drive trains from the right angle drive unit 96. This allows drive to be maintained even though the electrode holder 98 includes the opening 104. That is, the gears 132 and 134 are spaced apart a distance greater than the opening 104 so that one or the other of the gears is always in contact with the geared periphery of the electrode holder 98 at all times. The drive gear 136 is, of course, in driving engagement with the output gear 140 of the right angle drive assembly 96.

It should be noted that the right angle drive assembly 96 includes a machined block frame or housing element 142 which is preferably formed from a high strength thermoplastic and sized to be closely received and located by the recesses formed within the body sections 92A and 94A in the manner illustrated. The output gear 140 is suitably carried on a bearing and pin assembly which extends upwardly from the bottom of the housing or frame element 142. A bevel gear element 144 is formed integrally with the output gear 140 and mates with a corresponding bevel gear 146 mounted horizontally in a pair of bearings 148. The bearings 148 are suitably received in an opening 151 formed at the right hand end of block 142. The drive lug from the flexible drive element 76 is received in the interior of the shaft joined to the bevel gear 146 and is connected therewith through the use of a C-ring 152. This connection is also arranged to allow axial movement of the shaft portion 150 relative to the bevel gear 146 to permit axial movement as required during bending of the flexible drive cable 54. This connection is merely flats formed on the sides of shaft portion 15D which slidably engage the C-ring 152. By forming the right angle drive unit as a separate component with its own frame, maintenance, repair, and replacement of the drive is simplified.

The exterior housing of the flexible drive cable assembly 54 is connected at its end through a metal sleeve or end portion 156 that is clamped between the body sections 92A and 94A and joined thereto through a socket head machine screw 158.

In addition, connecting means 153 is provided to provide section 92a. Connecting means 153 is hinged to body section 92a with pin means 155.

The Tube Clamping and Holding Module C

Figure 4:
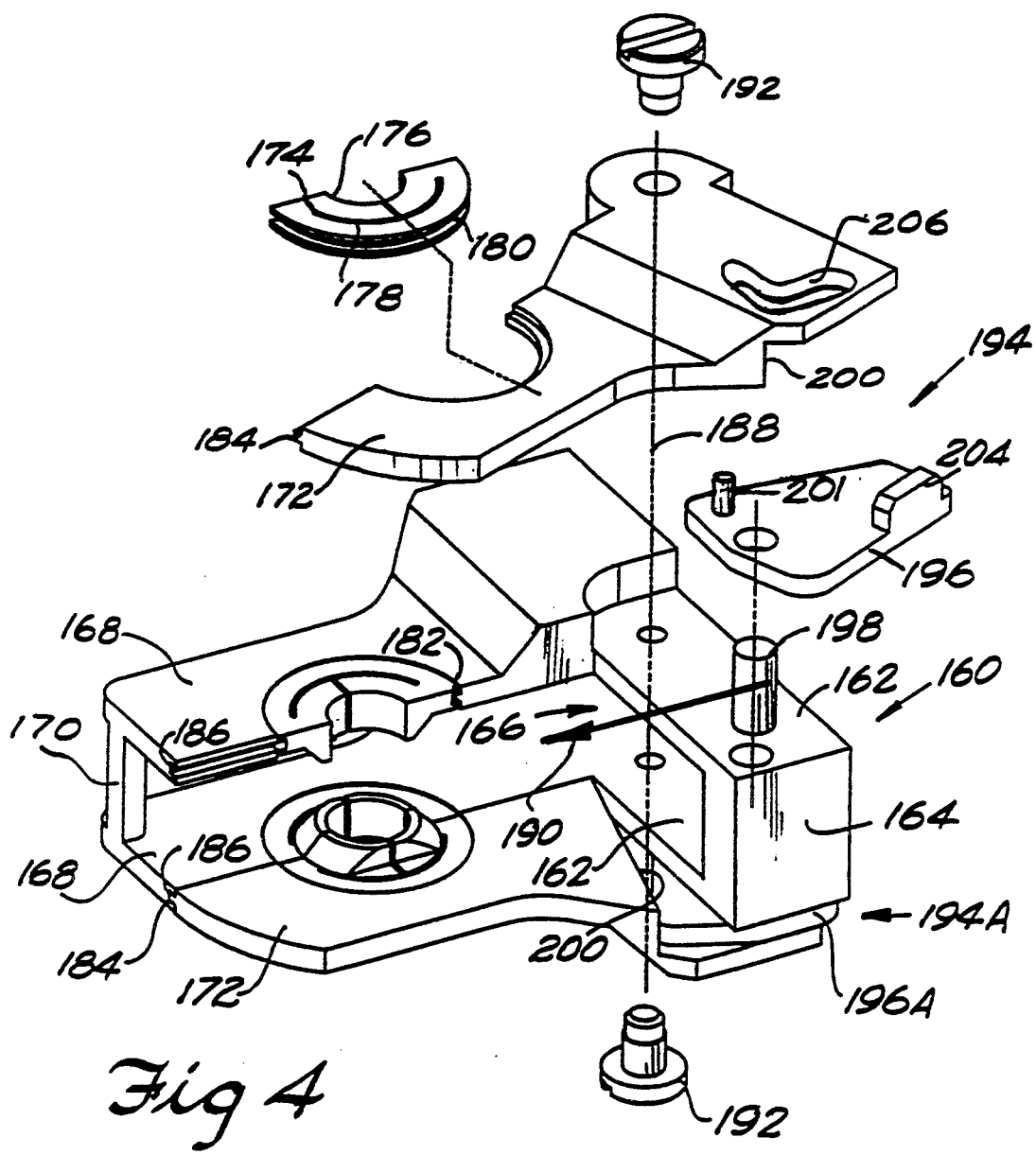
FIG. 4 is an exploded pictorial view of the tube clamping and holding module C of the assembly illustrated in FIG. 1.

The module can best be understood by reference to FIG. 4 which shows the module in somewhat of an exploded pictorial view. Broadly, the tube clamping and holding module is designed so as to be of minimum size capable of performing the function to thereby allow it to be used in extremely tight cramped spaced and to assembly miniature tube fittings in extremely compact small assemblies. The module is preferably formed from a high strength metal such as stainless steel and generally comprises a first substantially rectangular base assembly 160 comprising a pair of side members 162 which are joined by end members 164. The base defines a rectangular opening 166 which is sized to closely but slidably receive members 92B and 94B of the weld head assembly 90. FIG. 1 shows the weld head 90 and the fixture block module c in the assembled condition. When in this assembled condition, the members 92B and 94B extend through the base assembly 160 such that the opening 100 is located outwardly thereof or to the left as viewed in FIG. 4. Additionally, it should be understood that the base includes a boss with an opening or socket to receive plug element 122 (see FIG. 2A) to assure a good electrical connection with electrical cable 32a.

Associated with the base element 160 are a pair of outwardly extending clamp arms 168 which are joined to the base or formed integrally therewith to extend perpendicularly outward on opposite sides of the opening 166 to closely enclose the members 92B and 94B of the weld head assembly 90. In the embodiment under consideration, the pair of arms 168 are rigidly positioned and interconnected by a cross piece 170. Associated with the first pair of arms 168 is a second pair of clamp arms 172 which extend outwardly from the base assembly 160 in opposed aligned relationship with the first pair of arms 168. Each of the arms 172 are mounted for independent pivotal movement relative to the arms 168. The actual mounting and actuating mechanism will subsequently be described; however, it should be noted that each arm of the first pair of arms, as well as each arm of the second pair of arms, carries a tube clamp jaw 174. Although they could vary in construction, each of the clamp jaws 174 are identical and are of generally semi-circular shape and define a semi-cylindrical clamp face 176. The individual jaws 174 are provided with internal machined cuts 178 to produce resilient clamp portions such that the clamp faces themselves can resiliently engage the periphery of the tube ends being clamped. This design and the resilient nature of the clamp faces is the subject of a prior U.S. Pat. No. 4,868,367 and a pending application commonly assigned, Ser. No. 373,029, filed Jun. 28, 1989 for "Collet Assembly for Cylindrical Workpieces" which are incorporated by reference herein. Each of the individual clamp jaws is provided on its outer surface with a flange 180 which is engaged with a corresponding counterbore 182 formed in the circular recess into which it is respectively received in the corresponding arm element. Preferably, the individual clamp jaws are welded or otherwise positively connected in position in their respective clamp arms. It should be noted that each of the jaws is located such that when the movable second set of clamp arms 172 is actuated to the closed position illustrated in FIG. 1, the clamp jaws define spaced tube holding cylindrical sections which are located closely adjacent and coaxial with the electrode holder 98 of the weld head assembly 90. Additionally, it is preferable that the individual arms of the first and second sets of arms be provided with means to assure proper mating and alignment when they are in the tube clamping or closed position illustrated. For this purpose, the arms 172 are provided along their mating edge with a tongue element 184 which is arranged to be received within a corresponding groove 186 formed along the mating edge of the first pair of arms 168. Thus, when the arms are in the closed or tube clamping position, these cooperating tongues and grooves assure proper alignment of the individual arms relative to the orbital weld head 90.

Of particular importance to the tube clamping and holding module C is the manner in which the movable arms 172 are mounted and actuated. As illustrated in FIG. 4, each of the arms 172 are independently mounted for rotation about an axis 188 which extends transversely through the opening 166 and generally perpendicular to the path of insert movement of the weld head into the module C. This path of movement is illustrated generally by the arrow 190. Additionally, the two arms mate along a plane which includes the axis of opening 100 of the weld head module 90 as well as the axis 188. It has been found that when the jaws can be opened in this manner, the weld head and tube clamp assembly are capable of being inserted into extremely confined areas and can make welds on tubes located in structural corners and other confined areas not otherwise weldable with typical prior art units.

Figure 5:
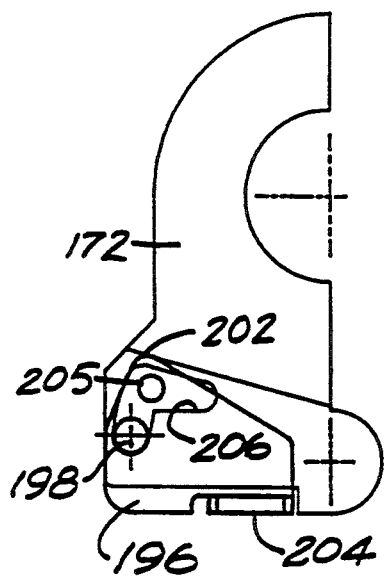
FIGS. 5-8 are partial side elevational views of the tube clamping and holding module, somewhat diagrammatic, showing the operation of the clamp arm actuating mechanism.
Figure 6:
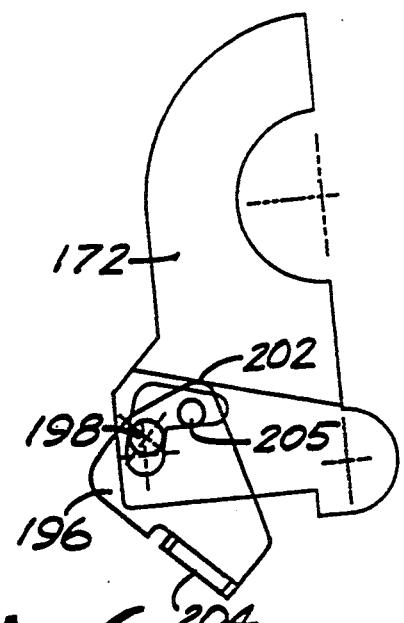
Figure 7:
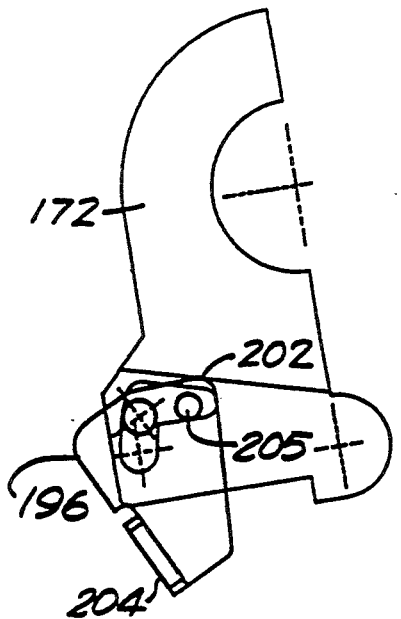

Although the particular manner of mounting the movable arms 172 could vary, in the subject embodiment a pair of shoulder screws 192 are received through suitable openings formed in the arms 172 and threadedly engaged with the sides 162 of the base assembly 160. Each of the arms 172 are independently actuated by a separate actuating means which takes the form in the subject embodiment of separate Cam actuating assembly 194 and 194A. These cam actuating assemblies are independently operable and move the associated arm 172 independently between open and closed positions. They are, however, mirror images of one another as can be readily appreciated. For present purposes, a detailed description of the assembly 194 and its method of operation should be understood as equally applicable to assembly 194A subject to the understanding that 194A is a mirror image of 194. Referring in particular to FIGS. 4-8, the operation of the operating or actuating assembly 194 can be understood. Specifically, as shown, the actuating assembly 194 includes a cam plate member 196 which is mounted for pivotal movement about a pin 198 which is positioned such that the axis of rotation of the cam plate member 196 is parallel to the axis 188. The cam plate is located in an enclosed position between the lateral side 162 and the associated arm 172 as best seen in FIG. 4. Each of the arms 172 includes a cam surface 200 which is inclined as best shown in FIG. 5. The cam surface 200 extends transversely of the arm and is engaged by an outwardly extending cam lobe 202 carried on plate member 196. Additionally, the overall shape of plate member 196 is best illustrated in FIG. 5 and includes a laterally extending handle portion or actuating member 204 which is accessible from the end of the module C. The cam plate 196 also carries a pin 205 which extends outwardly through the arm 172. As best illustrated in FIGS. 4 and 5, the arm includes a somewhat L-shaped opening 206 into which the pin 205 and the outer end of pivot pin 198 can extend.

Figure 8:
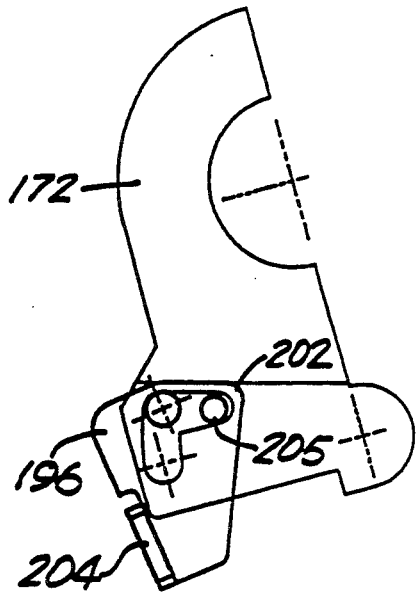

Referring more particularly to FIGS. 5–8, the overall operation of the actuating mechanism can best be understood. FIG. 5 shows the arm 172 in its tube clamping or closed position. In this position, the cam lobe 202 is in somewhat of an over center position and the pin 205 is spaced from the sides of the L-shaped opening 206. If the actuating member 204 is pulled in the direction of the arrow shown in FIG. 6, the pin 205 engages the side of opening 206 as shown. With further movement in the direction of the arrow, the cam plate is rotated rotating the pin 205 to engage the surface and drive the arm 172 in a counter-clockwise direction. Continued movement moves the arm to a full open non-clamping position as illustrated in FIG. 8. In this position, the spacing between the outer ends of the arms 172 and the cooperating arms 168 are such as to allow the jaws to be moved into and out of engagement with the tube ends which are being welded or have just been welded.

When the cam plate member is actuated in the opposite direction, the cam lobe 202 engages with the surface 200 and applies a closing force to move the associated arm 172 back in a Clockwise direction to a closed direction as viewed in FIGS. 5–8. It should be noted that throughout this movement that a positive drive takes place and when in the FIG. 5 position, the cam plate 196 is generally in a slightly over center position so that it tends to maintain its clamped position until it is manually moved in the opening direction. It should be noted further that during the closing operation, the pin 205 does not act to move the arm 172.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus been described, it is now claimed that:

1. An orbital welding apparatus comprising:
    a first housing defining a weld head and having a circular rotor disposed therein for rotation about a first axis, a welding electrode carried by said rotor and extending radially inward toward said first axis, drive gears in said first housing for rotating said rotor about said first axis and a first drive shaft drivingly connected to said drive gears and extending from said first housing in a direction perpendicular to said first axis;
    a second housing separate from said first housing and having a second drive shaft extending therethrough;
    a flexible drive shaft means connecting said first drive shaft and said second drive shaft for conducting rotary drive forces from said second drive shaft to said first drive shaft while permitting the relative orientations of said first and second housings to be freely adjustable;
    a third housing carrying an electric drive motor having a rotary output shaft;
    a gas flow line and electric power cables extending through said second and third housings for supplying gas and electric power to said first housing; and,
    connecting means for permitting rapid selective connection and disconnection of said third housing with said second housing and while simultaneously connecting and disconnecting said output shaft and said second drive shaft and said gas lines and said power cables in said second and third housing.

2. An orbital welding apparatus as defined in claim 1 including a gas flow line extending from said second housing through said flexible drive shaft means to said first housing for supplying gas to said weld head.

3. An orbital welding apparatus as defined in claim 1 wherein said drive gears include gears carried in a gear support frame which is removable as a unit from said first housing.

4. An orbital welding apparatus as defined in claim 1 wherein said electrical power cables in said second housing extend through said flexible drive shaft means to said first housing.

5. An orbital welding apparatus as defined in claim 1 wherein said connecting means includes axially engagable plug members for connecting and disconnecting said power cables.

6. An orbital welding apparatus as defined in claim 1 wherein said connecting means includes manually operable latch members.

7. An orbital welding apparatus as defined in claim 1 wherein said connecting means includes an axially engagable drive connection between said output shaft and said second drive shaft.

8. An orbital welding apparatus as defined in claim 1 including a tube clamp assembly slidably received by said first housing for holding a cylindrical tube within said circular rotor at a location concentric with said first axis.

9. An orbital welding apparatus as defined in claim 8 wherein said clamp assembly includes cooperating clamp jaws mounted for pivotal movement about an axis parallel with said first axis and generally perpendicularly aligned with said first drive shaft.

10. For use in an orbital welding apparatus, a tube clamping assembly for holding cylindrical tube ends in axially aligned abutting relationship while welding is performed to join said tube ends, said clamping assembly including:
    a generally rectangular base with an opening extending therethrough for receiving an orbital weld head;
    a first pair of transversely spaced clamp arms extending from said base on opposite sides of said opening;
    a second pair of transversely spaced clamp arms extending from said base on opposite sides of said opening in alignment with said first pair of clamp arms;
    said first and second pairs of clamp arms including cooperating clamp jaws for gripping on opposite sides of the tube ends to be welded and maintaining them coaxially aligned with a first axis;
    pivot means mounting said second pair of arms for pivotal movement in a first direction about a second axis parallel to said first axis to move the clamp jaws in a first direction to a tube end gripping position;
    the arms in said second pair of arms each having a cam plate member associated therewith and positioned between the base and the respective arm for moving said respective arm about said second axis, each cam plate member mounted for independent pivotal movement about a third axis parallel to said first axis; and,
    said first and second axes being in a common plane which is generally perpendicular to said base.

11. The tube clamping assembly as defined in claim 10 wherein said opening is rectangular and the common plane which includes said first and second axes is perpendicular to a pair of opposed sides of said rectangular opening.

12. The tube clamping assembly as defined in claim 10 wherein the arms in said first and second pairs of arms each have a semi-cylindrical clamp jaw.

13. The tube clamping assembly as defined in claim 12 wherein said arms in said first pair of arms are fixed to said base and wherein the semi-cylindrical clamp jaws carried by said arms in said first pair of arms open toward said common plane which includes said first and second axes.

14. The tube clamping assembly as defined in claim 13 wherein each cam plate member includes a pin in engagement with the associated respective arm to move the associated respective arm a tube release position when said cam plate member is rotated in a direction opposite said first direction.

15. An orbital welding apparatus for welding abutting ends of cylindrical tubes comprising:
    an orbital welding head including a housing with an electrode holder means having an electrode mounted therein for rotation in a single plane about a first axis;
    a tube clamping assembly for positioning and holding the cylindrical tubes to be welded in aligned abutting relationship coaxial with said first axis with their ends abutting in said single plane;
    said tube clamping assembly including a base having opposed first and second sides with a through opening defining a path to slidably receive said housing with said housing extending through said base from said first to said second sides and said electrode holder means located at a distance from said base on the second side thereof;
    first and second pairs of clamp arms extending from said base along opposite sides of said housing outwardly of said second side;
    said first and second pairs of clamp arms being in opposed alignment and carrying opposed semi-cylindrical clamp jaws;
    pivot means mounting said second pair of clamp arms for pivotal movement about a second axis parallel to said first axis;
    said first and second axes lying in a common plane which is parallel to said path defined by said base;
    actuating means for pivoting said second pair of clamp arms about said second axis between a tube clamping position and a tube release position; and,
    said actuating means located between said base and said arms and including a pivotal cam element.

16. The orbital welding apparatus as defined in claim 15 wherein there are separate and independently operable actuating means for each arm of said second pair of arms and wherein said semi-cylindrical clamp jaws of said first and second pairs of arms meet in said common plane when said second pair of clamp arms are in said tube clamping position.

17. The orbital welding apparatus as defined in claim 16 including latch means for releasably retaining said welding head in said tube clamping assembly and wherein said first and second pairs of clamp arms are located on opposite sides of said common plane.

18. The orbital welding apparatus as defined in claim 17 wherein said clamp jaws are each formed from a separate component.

19. The orbital welding apparatus for welding abutting ends of cylindrical components comprising:
    an orbital welding head including a housing having an electrode holder means mounted therein for rotating an electrode in a circular path lying in a single plane about a first axis;
    a clamping means releasably connected to said housing for positioning and holding the cylindrical components in axially aligned relationship with their axes coaxial with said first axis and their ends abuttingly in said single plane;
    said clamping means further including first and second pairs of clamp arms mounted in opposed relationship and having cooperating clamp jaws for gripping on opposite sides of the tube ends to be welded;
    pivot means mounting said second pair of arms for pivotal movement in a first direction about a second axis parallel to said first axis to move the clamp jaws in a first direction to a tube end gripping position;
    actuating means for moving said second pair of arms in said first direction, said actuating means including a cam plate member associated with each arm, each cam plate member mounted for pivotal movement about a third axis parallel to said first axis;
    a base member supporting said first and second pairs of clamp jaws, said base member including an opening through which the housing of said orbital welding head extends, said cam plate members lying between the associated arm and the base member externally of said opening with operating means outwardly of said base on the side of said base opposite said first axis.

20. The apparatus as defined in claim 19 wherein said first pair of jaws is fixedly connected to said base and mate with said second pair of jaws along a plane which is generally perpendicular to said base.

21. The apparatus as defined in claim 20 wherein said second pair of jaws and said first pair of jaws include interengaging alignment means adjacent said clamp jaws.

22. An orbital welding apparatus for welding abutting ends of cylindrical members comprising:
    an orbital welding head including a housing with an electrode holder means having an electrode mounted therein for rotation in a first plane about a first axis;
    a clamping assembly including movable clamp arms movable between an open position and a closed position for positioning and holding the cylindrical members to be welded in an axially aligned relationship their ends abutting in a single plane;
    said clamping assembly including a base with an opening defining a path to releasably receive said housing and hold said housing in an operative position with the axes of the cylindrical members aligned with said first axis and their ends abutting in said first plane;
    releasable connecting means for connecting said housing to said clamping assembly when said housing is in said operative position;
    means for preventing movement of said movable clamp arms to said open position when said housing is in said operative position; and,
    actuating means for moving said movable clamp arms between said open and closed positions and wherein said means for preventing movement of said movable clamp arms to said open position when said housing is in said operative position includes a surface portion of said housing which blocks movement of said actuating means when said housing is in said operative position.

23. The orbital welding apparatus as defined in claim 22 wherein said clamping assembly further includes fixed position clamp arms which cooperate with said movable clamp arms, said fixed position clamp arms and said movable clamp arms extending outwardly from said base on opposite sides of said path.

24. The orbital welding apparatus as defined in claim 22 wherein said actuating means includes an operating portion extending from said base and engaged by said housing when said housing is in said operative position.

25. An orbital welding apparatus for welding abutting ends of cylindrical members comprising:
- an orbital welding head including a housing with an electrode holder means having an electrode mounted therein for rotation in a first plane about a first axis;
- a clamping assembly including movable clamp arms movable between an open position and a closed position for positioning and holding the cylindrical members to be welded in an axially aligned relationship their ends abutting in a single plane;
- said clamping assembly including a base with an opening defining a path to releasably receive said housing and hold said housing in an operative position with the axes of the cylindrical members aligned with said first axis and their ends abutting in said first plane;
- releasably connecting means for connecting said housing to said clamping assembly when said housing is in said operative position; and,
- means for preventing movement of said movable clamp arms to said open position when said housing is in said operative position; and,
- actuating means for moving said movable clamp arms between said open and closed position and including a cam plate ember mounted for rotation in said base with an operating portion extending out of said base.

26. An orbital welding apparatus comprising:
- a first housing defining a weld head and having a circular rotor disposed therein for rotation about a first axis, a welding electrode carried by said rotor and extending radially inward toward said first axis, drive gears in said first housing for rotating said rotor about said first axis and a drive shaft drivingly connected to said gears;
- a separate housing carrying an electric drive motor having a rotary output shaft;
- each said first and separate housings carrying a gas flow line and electric power cables for supplying gas and electric power to said weld head;
- connecting means for permitting selective manual connection and disconnection of said first and said separate housings, said connecting means including means for producing simultaneous connection and disconnection of said drive shaft and said rotary output shaft while simultaneously connecting and disconnecting said gas lines and said power cables in said first and separate housings; and,
- a flexible drive shaft drivingly connected between said drive shaft and said gears with said flexible drive shaft and said power cable and said gas lines extending through a common flexible housing.

* * * * *